United States Patent Office 3,330,813
Patented July 11, 1967

---

3,330,813
1,1-DIALKYL - 3 - (TETRAHYDROETHANOPENTA-LENYL) THIOUREAS AND THEIR USE AS VULCANIZATION ACCELERATORS FOR CHLOROPRENE POLYMERS
Wilhelm Franz Gruber, Wilmington, Del., assignor to E. I. du Pont de Nemours and Company, Wilmington, Del., a corporation of Delaware
No Drawing. Filed Mar. 26, 1964, Ser. No. 355,111
6 Claims. (Cl. 260—79.5)

This invention relates to new chemical compounds and their use as vulcanization accelerators for chloroprene polymers.

Chloroprene homopolymers and copolymers with dienes or vinyl compounds, in which units derived from the chloroprene monomer constitute at least 40 percent of the polymeric composition, are highly useful synthetic rubbers. These chloroprene polymers differ from other synthetic rubbers and from natural rubber in the manner in which they can be vulcanized. With most types of chloroprene polymers, good vulcanizates may be obtained by incorporating certain metal oxides, such as zinc oxide and magnesia, into the polymer and heating to effect vulcanization. However, it is customary to use, in conjunction with the metal oxides, certain organic accelerators which increase the rate of cure and improve the properties of the vulcanizates. With some types of chloroprene polymers, such as those which are prepared in the presence of aliphatic mercaptans, metal oxides act slowly and do not produce a high state of cure even after long periods of heating. With chloroprene polymers of this type, accelerators are necessary for a good cure.

Because of their activity at relatively low temperatures, care must be taken in using the vulcanization accelerators to prevent premature vulcanization (scorching) during the processing. While the accelerators in current use produce excellent vulcanizates, there is still a need for effective vulcanization accelerators for chloroprene polymers which provide a wide margin of processing safety.

It is an object of the present invention to provide new chemical compounds. A further object of this invention is to provide new vulcanization accelerators for chloroprene polymers, which vulcanization accelerators possess a wide margin of processing safety. And a further object of this invention is to provide a new process for accelerating the vulcanization of chloroprene polymers. Other objects will appear hereinafter.

The new compounds of the present invention are 1,1-dialkyl-3-(tetrahydroethanopentalenyl)thioureas and have the structure

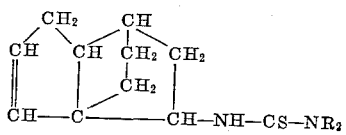

wherein R is methyl or ethyl.

These compounds are prepared from dicyclopentadiene by first forming an isothiocyanato compound as described in Example 1 of U.S. Patent No. 2,395,455. This isocyanato compound has the structure

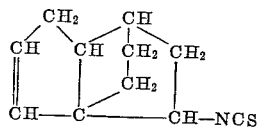

The parent ring of this compound is sometimes called "Dihydronordicyclopentadiene." The name used by Chemical Abstracts is 2,3,6,6a-tetrahydro-1H-1,3a-ethanopentalene.

The thioureas of the present invention are prepared from the isothiocyanato compound by reacting it with an amine corresponding to the formula $R_2NH$ wherein R is methyl or ethyl.

The reaction is carried out in a solvent in which at least one reaction component is soluble, such as water or methanol. Conveniently, the reaction is carried out at a temperature slightly below the boiling point of the solvent used.

The thioureas of the present invention are useful in accelerating the cure of chloroprene polymers without scorch by incorporating into said copolymers vulcanizing agents and an accelerating amount of 1,1-dialkyl-3-(tetrahydroethanopentalenyl)thioureas wherein the dialkyl is selected from the group consisting of methyl and ethyl, and thereafter heating the polymer to effect vulcanization thereof.

The chloroprene polymers which may be cured in accordance with this invention are homopolymers of chloroprene (2-chloro-1,3-butadiene) and copolymers of chloroprene with other copolymerizable monomers containing the terminal grouping $CH_2=CH<$, which copolymers contain at least 40 percent by weight of the chloroprene monomer, based on the total weight of the polymer. Examples of suitable copolymerizable monomers include the following representative types: vinyl-substituted aromatic compounds, such as styrene, vinyltoluenes, and vinylnaphthalenes; acrylic and methacrylic acids and derivatives thereof such as esters and nitriles, e.g., methyl methacrylate and acrylonitrile; and conjugated diolefinic compounds such as 1,3-butadiene, isoprene, and 2,3-dichloro-1,3-butadiene.

The chloroprene polymers are prepared by methods well known in the art and are, for example, described in U.S. Patents Nos. 2,494,087; 2,576,009; 2,567,117; 2,426,854; and 2,914,497.

The new thiourea compounds of the present invention may be used in amounts ranging from about 0.7 to about 1.5 parts by weight per 100 parts of polymer to obtain satisfactory acceleration of the cure. Amounts lower than 0.7 part may give unsatisfactory cures. There is usually no advantage in using more than 1.5 parts and it is uneconomical.

Magnesia and zinc oxide are the usual vulcanizing agents which are both added to chloroprene polymer. The magnesia concentration ranges from about 0.5 to 15 parts by weight per 100 parts of polymer; about 4 parts is the preferred amount. The zinc oxide concentration ranges from about 2 to 15 parts by weight per 100 parts of polymer; about 5 parts is the preferred amount.

Any of the antioxidants such as N-phenyl-2-naphthylamine, N-phenyl-1-naphthylamine, or 2,2'-methylenebis (4-methyl-6-tert-butylphenol), coloring matters, and other types of compounding ingredients commonly used in fabricating articles from chloroprene polymers may be incorporated into the polymers prior to the cure.

The vulcanization is effected by heating at from about 125° C. to about 200° C. The preferred range is 140° C. to 175° C. The heating may be carried out in molds under pressure, or the shaped articles may be heated with steam or hot air or treated in a hot liquid bath. The compounds of this invention may also be used as accelerators in latex or cements.

The following examples, in which parts and percents are by weight unless otherwise indicated, are illustrative of the present invention.

EXAMPLE 1

A. *Preparation of the intermediate, 3-isothiocyanato-2,3,6,6a-tetrahydro-1H-1,3a-ethanopentalene*

A mixture of 132 grams (1 mole) of dicyclopentadiene, 75 ml. of water, and 76 grams (1 mole) of ammonium thiocyanate is rapidly stirred at 90–95° C. under a reflux condenser. To this solution, 100 grams of concentrated hydrochloric acid (1.01 moles) is added dropwise during the course of 1 hour, while the mixture is rapidly stirred for 3 hours longer while maintaining the same temperature. The reaction mixture is filtered hot to remove small amounts of polythiocyanic acid and transferred to a separatory funnel. The organic layer is separated, washed with water, and dried with calcium chloride. The product is purified by vacuum distillation.

*Fraction 1.*—Boiling Range 51–55° C. at 30 mm. Hg: 11 grams of starting material.

*Fraction 2.*—Boiling Range 76–80° C. at 0.1 mm. Hg: 130 grams of 3-isocyanato-2,3,6,6a-tetrahydro-1H-1, 3a-ethanopentalene (74% yield). The compound is a pale yellow, viscous liquid.

B. *Preparation of 1-(2,3,6,6a-tetrahydro-1H-1,3a-ethanopentalen-3-yl)-2-thiourea*

For later comparison, the compound in which R is hydrogen (shown in U.S. Patent No. 2,395,455) is prepared by reacting the product of Part A of this example with ammonia.

A mixture of 19.0 grams of isothiocyanate prepared in Example A and 100 grams of concentrated ammonium hydroxide is rapidly stirred for 20 minutes at room temperature and finally heated on a steam bath for 2 hours. To this semi-solid mass, another 100 gram portion of concentrated ammonium hydroxide is added and stirring at 90–95° C. is continued for 3 hours. After cooling, the crude thiourea is collected and dried: M.P. 193–199° C., yield: 20.0 grams (95% based on isothiocyanate). After recrystallization from ethanol the product has a melting point of 202–205° C. (uncorr.) which is not changed by another recrystallization. (The melting point reported in the literature is 202–203° C.)

EXAMPLE 2

*Preparation of 1,1-dimethyl-3-(2,3,6,6a-tetrahydro-1H-1,3a-ethanopentalen-3-yl)-2-thiourea*

26 grams (0.136 mole) of the isothiocyanate prepared in Part A of Example 1 is slowly added from a dropping funnel to 27 grams of a well-stirred 25 percent aqueous solution of dimethylamine (6.76 grams of amine, 0.150 mole). The reaction temperature is kept between 25 and 30° C. by external cooling. After the first exothermic reaction subsides, the mixture is heated at 50° C. under a reflux condenser for 6 hours. After cooling to 15° C. the creamy, wax-like precipitate solidifies completely and is collected on a Buchner funnel. After drying in a desiccator, 30 grams of crude product is obtained (95 percent based on isothiocyanate starting material) which has a melting point of 95–107° C. The sample for analysis and testing is recrystallized from methanol. It has a melting point of 112–114° C. (uncorr.). Analyses show the following:

Calculated for $C_{13}H_{20}N_2S$: C, 66.01%; H, 8.52%; N, 11.86%; S, 13.56%. Found: C, 66.1, 66.2%; H, 8.4, 8.6%; N, 11.8, 11.8%; S, 13.8, 13.7%.

EXAMPLE 3

*Preparation of 1,1-diethyl-3-(2,3,6,6a-tetrahydro-1H,1a-ethanopentalen-3-yl)-2-thiourea*

The procedure of Example 2 is followed using 19.1 grams (0.10 mole) of the isothiocyanate compound and 8.0 grams (0.11 mole) of diethylamine in 80 ml. of methanol. The temperature is again kept at 25–30° C. during the addition of the isothiocyanate; after the addition is completed the mixture is refluxed for 4 hours. The product, 1,1-diethyl-3-(2,3,6,6a-tetrahydro-1H-1,3a-ethanopentalen-3-yl)-2-thiourea, which crystallizes out on cooling the reaction mass, has a melting point of 104–105° C. Analyses show the following:

Calculated for $C_{15}H_{24}N_2S$: C, 68.13%; H, 9.15%; N, 10.61%; S, 12.12%. Found: C, 67.7, 67.7%; H, 9.1, 9.2%; N, 10.5, 10.7%; S, 12.4, 12.2%.

EXAMPLE 4

For testing, compounded stocks are prepared using the following recipe:

| | Parts by weight |
|---|---|
| Chloroprene polymer | 100 |
| N-Phenyl-1-naphthylamine | 2 |
| Stearic acid | 0.5 |
| Magnesia | 4 |
| Semi-reinforcing furnace carbon black | 29 |
| Zinc oxide | 5 |
| Accelerator (as shown) | 1 |

The chloroprene polymer used in the recipes is prepared by the emulsion polymerization of chloroprene in the presence of an alkyl mercaptan as modifier as described in Example 6 of U.S. Patent No. 2,494,087. The processing safety is measured by obtaining Mooney scorch data at 121° C. according to ASTM Method D-1646-61 using the small rotor. The compounded stock is cured in a mold in a press at 153° C. for 15 minutes. The tensile properties of the cured samples are obtained by ASTM Method D-412-51 T. The following table shows the data.

The accelerators tested have the following general formula:

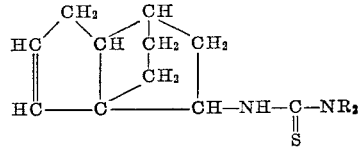

| R= | $CH_3$ | $C_2H_5$ | H |
|---|---|---|---|
| Mooney Scorch Data: | | | |
| Minimum | 22 | 22 | 25 |
| Minutes to 10-point rise | 31 | 45 | 11 |
| Tensile Properties: | | | |
| Modulus at 300% elongation, p.s.i | 1,200 | 1,200 | 1,250 |
| Tensile strength at break, p.s.i | 3,200 | 2,850 | 3,150 |
| Elongation at break, percent | 535 | 520 | 530 |

It will be noted that when R of the general formula is H the time for a viscosity rise of 10 points is short, and that the dialkyl thiourea compounds of this invention are far superior in processing safety to the compound in which R is H. The improved acceleration is also obtained with the other chloroprene polymers disclosed.

As many widely different embodiments of this invention may be made without departing from the spirit and scope thereof, it is to be understood that this invention is not limited to the specific embodiments thereof except as defined in the appended claims.

What is claimed is:
1. Compounds of the structure

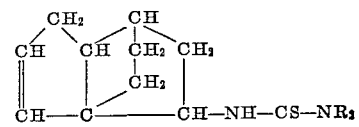

wherein R is a radical selected from the group consisting of methyl and ethyl.

2. 1,1-dimethyl-3-(2,3,6,6a-tetrahydro-1H-1,3a-ethanopentalen-3-yl)-2-thiourea.

3. 1,1-diethyl-3-(2,3,6,6a-tetrahydro-1H-1,3a-ethanopentalen-3-yl)-2-thiourea.

4. A process for accelerating the vulcanization of a chloroprene polymer, comprising incorporating into said polymer magnesium oxide, zinc oxide and an accelerating amount of a compound of the structure

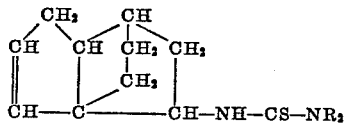

wherein R is a radical selected from the group consisting of methyl and ethyl, and thereafter heating said polymer to effect vulcanization thereof.

5. The process of claim 4 wherein said compound is present in the amount of 0.7 to 1.5 parts by weight per 100 parts by weight of said polymer.

6. The process of claim 4 wherein said polymer is chloroprene homopolymer.

References Cited

UNITED STATES PATENTS

| | | | |
|---|---|---|---|
| 2,395,455 | 2/1946 | Bruson | 260—552 |
| 2,911,393 | 11/1959 | Brooks et al. | 260—92.3 |
| 2,958,680 | 11/1960 | Brooks et al. | 260—79.5 |

JOSEPH L. SCHOFER, *Primary Examiner.*

H. I. CANTOR, *Assistant Examiner.*